United States Patent [19]

Chiu et al.

[11] 4,378,535

[45] Mar. 29, 1983

[54] ADAPTIVE EQUALIZER FOR SHORT DISTANCE METALLIC CIRCUITS

[75] Inventors: Ran F. Chiu; Yoon B. Park, both of Miami; David E. Nizel, North Miami Beach, all of Fla.

[73] Assignee: Racal-Milgo, Inc., Miami, Fla.

[21] Appl. No.: 149,487

[22] Filed: May 13, 1980

Related U.S. Application Data

[63] Continuation of Ser. No. 839,341, Oct. 4, 1977, abandoned.

[51] Int. Cl.³ ............................................. H03H 11/06
[52] U.S. Cl. ........................................ 333/18; 330/86; 330/109
[58] Field of Search .......................... 333/14, 18, 28 R; 330/86, 103, 109, 282, 294, 304; 307/552, 553; 375/12, 14

[56] References Cited

U.S. PATENT DOCUMENTS

| | | | |
|---|---|---|---|
| 3,904,992 | 9/1975 | Iwakami | 333/18 |
| 4,061,970 | 12/1977 | Magneron | 333/18 X |
| 4,105,945 | 8/1978 | Sano et al. | 330/294 |
| 4,122,417 | 10/1978 | Takasaki et al. | 333/28 R |

Primary Examiner—Paul L. Gensler
Attorney, Agent, or Firm—Jackson, Jones & Price

[57] ABSTRACT

An automatically adjusted equalizer circuit includes an operational amplifier having a parallel resonant circuit, a voltage controlled resistor, and an amplifier output signal monitoring circuit in a feedback path for the adjustable equalizer. The presence of the parallel resonant circuit in the feedback path causes the amplifier gain to vary with frequency. An input signal to the operational amplifier will be distorted depending upon the particular loss characteristic of a telephone wire to which the input is connected. Automatic adjustment of the voltage controlled resistor, and the presence of the resonant circuit, causes the slope of the gain of the amplifier to inversely compensate for the loss characteristic of the particular line in question. Within the variety of lines, each line will have different loss characteristics as a function of length and gauge of the different telephone lines. This equalizer automatically provides a compensated output signal which is equalized for the particular loss characteristic of the line selected from such a variety of lines.

16 Claims, 5 Drawing Figures

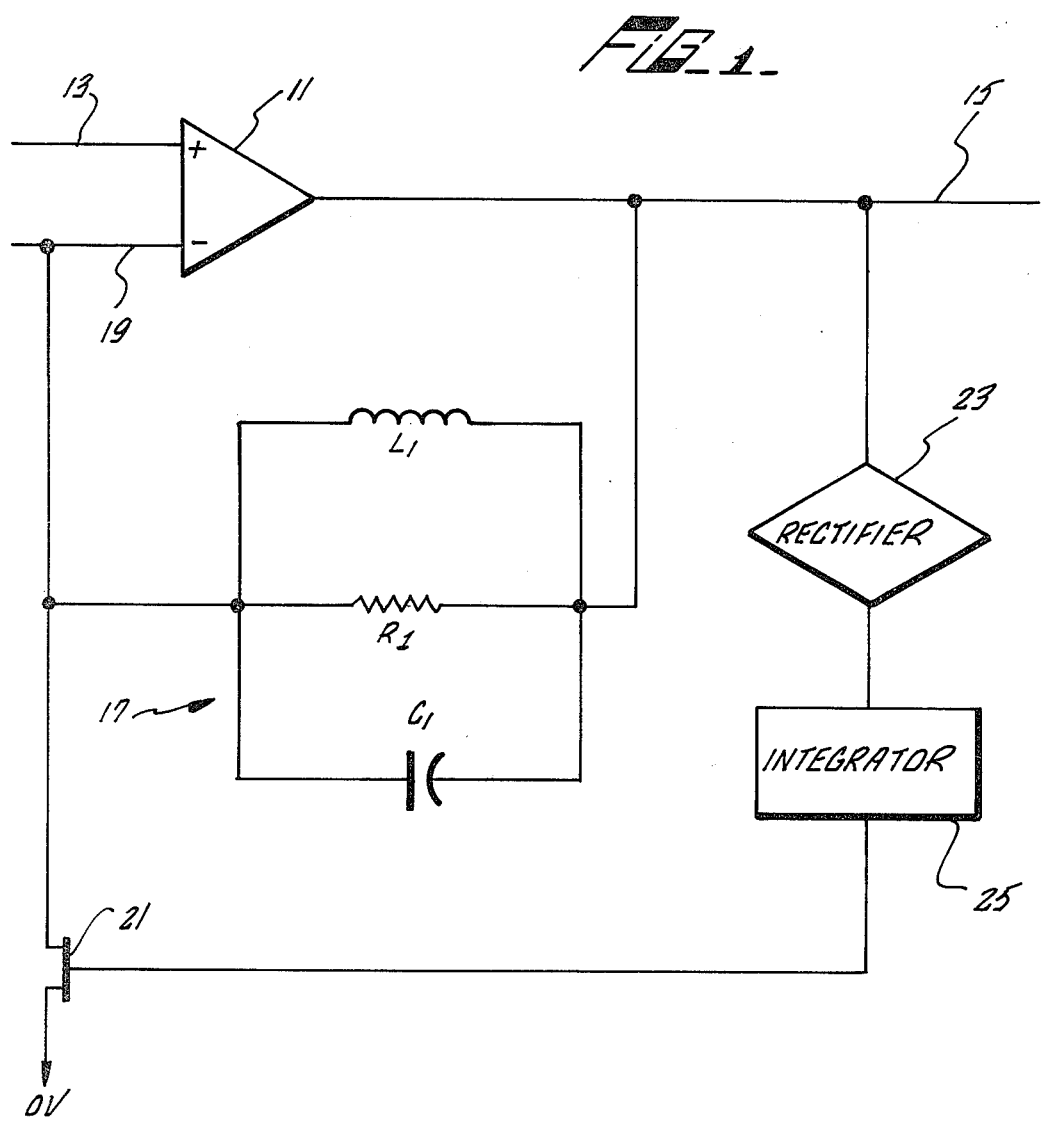
FIG_1_
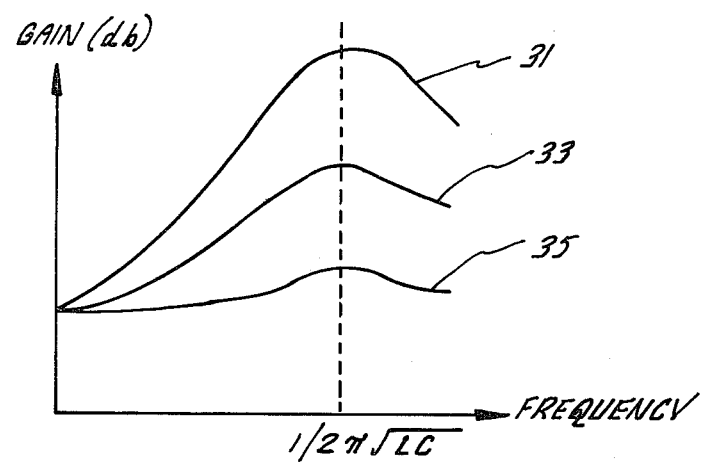
FIG_2_

ATTENUATION DISTORTION CHARACTERISTICS OF NO. 19 GAUGE WIRE LINES

AMPLITUDE COMPENSATION CHARACTERISTICS OF AUTOMATIC EQUALIZER

NET AMPLITUDE DISTORTION OF NO. 19 GAUGE WIRE LINE PATH WITH COMPENSATION FROM AUTOMATIC EQUALIZER

ADAPTIVE EQUALIZER FOR SHORT DISTANCE METALLIC CIRCUITS

This is a continuation of application Ser. No. 839,341, filed Oct. 4, 1977, now abandoned.

BACKGROUND OF THE INVENTION

The subject invention pertains to distortion correcting circuitry for telephone lines or cables. More particularly, this invention pertains to an adaptive equalizer for use in modems designed to operate over short distance metallic telephone circuits which are typically under 30 miles in length. In certain typical data communication situations automatic or adaptive, adjustment for any one line from a variety of lines is necessary. The loss characteristics of the variety of lines differ from one line to another over a wide degree depending on the size (gauge) and the wire length of the particular line in use. In order to compensate for distortion, due to the loss characteristic of such lines, it is necessary to utilize a circuit which will provide numerous degrees of amplitude slope compensation. Accordingly, an adaptive equalizer circuit for general application must be designed to operate on any given line and account for the diverse loss characteristics presented by the vast variety of such lines that may be available to modems.

One typical prior art circuit useful in systems as described above is set forth in an article entitled "Local Distribution Systems" appearing in the Bell Systems Technical Journal, pages 919-942 of the May/June issue, 1975. That prior art circuitry employs a fixed equalizer designed to compensate for the line having the worst degree of loss of amplitude with frequency that would be expected for the wide variety of lines. A second circuit in combination with the fixed equalizer automatically adjusts the line signal, based on the peak output of the fixed equalizer, such that the output of the second circuit hopefully compensates for the distortion caused by the fixed equalizer. Thus, this prior art circuit operates, in summary, to compensate to the greatest extreme that is expected, and there after distorts further in an attempt to recover back to an equalized condition.

The subject invention provides a totally different approach to solving the equalizer problems described above. This invention eliminates the need for a fixed equalizer and the need for any additional signal distortion circuit as described in the above-noted Bell Technical Journal. Rather than setting up a fixed slope and adding line losses in variable amounts, as is known in the prior art; the present invention provides a resonant circuit in a variable gain amplifier feedback path which responds to feedback signals so as to cause the gain of the amplifier to automatically adjust in a manner inversely matching the particular loss characteristic for any given line selected as needed from a wide variety of lines all of which have widely varying loss characteristics. The present invention, operating with its new features, provides simplified circuitry and valuable improvements in the communication art.

SUMMARY OF THE INVENTION

It is therefore an object of the invention to provide an improved equalizer circuit.

It is another object of the invention to provide an adaptive equalizer for use in equalizing short distance metallic lines.

These and other objects and advantages are accomplished according to the invention by an amplifier and means for controlling the amplifier's gain to inversely match the loss characteristic produced by various metallic lines.

More specifically, an operational amplifier is provided with a parallel resonant circuit in its feedback path. A variable resistance in the feedback path is adjusted in response to the amplifier output signal. As the resistance is varied, not only does the overall voltage gain vary, but, as the overall voltage gain is increased a markedly higher rate of gain increase occurs near the resonant frequency of the parallel resonant circuit. This operation causes the overall gain in frequency of the amplifier to closely approximate the loss characteristic and thus compensate for the distortion produced by the transmission line, regardless of its length or wire size.

BRIEF DESCRIPTION OF THE DRAWINGS

The preferred embodiment and best mode presently contemplated for practicing the just summarized invention will now be described in detail in conjunction with the drawings of which:

FIG. 1 is a circuit schematic of the preferred embodiment of the invention.

FIG. 2 is a gain vs. frequency plot illustrating operation of the circuit of FIG. 1.

DETAILED DESCRIPTION OF THE PREFERRED EMBODIMENT

Figure 3A:
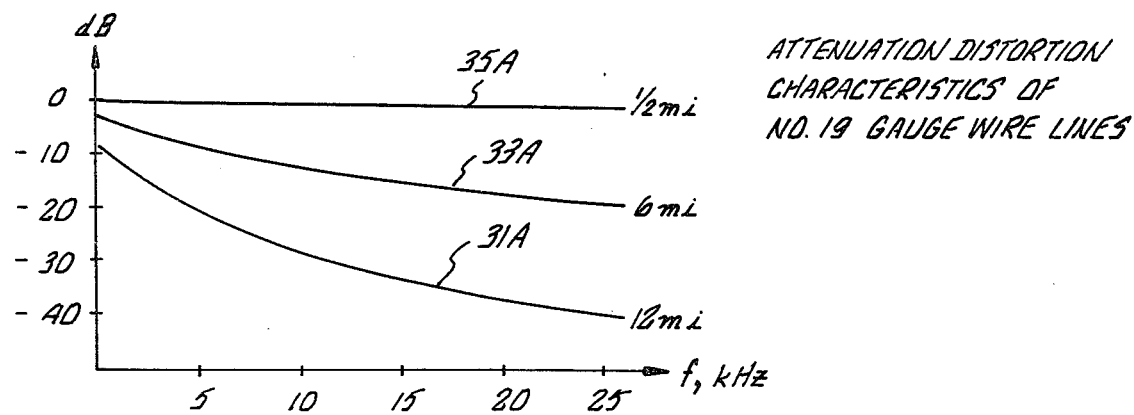
FIGS. 3A, 3B and 3C include the features of FIG. 2 in conjunction with other graphs which depict the equalizer operation of this invention.

As illustrated in FIG. 1, the preferred embodiment of the invention includes an operational amplifier 11, which receives an input on a terminal 13 and produces an output signal on an output terminal 15. The input signal is the received signal from a short metallic line, which may be lowpass filtered by a previous stage before being supplied to the input terminal 13.

The gain between the input and output terminals 13, 15 is controlled by a parallel resonant feedback circuit 17 connected between the output terminal and the inverting input 19 of the operational amplifier and by a variable resistance 21 connected between signal ground and the inverting input 19, and controlled in response to the output of the output terminal 15. The feedback circuit 17 includes a capacitor $C_1$, a resistor $R_1$ and an inductor $L_1$.

The value of the variable resistance 21 is controlled in accordance with a voltage developed by a full-wave rectifier 23 and an integrator 25. The output signal at terminal 15 is thus full-wave rectified by the rectifier 23 and then integrated by the integrator 25 to provide a voltage control signal related to the average value of the rectified output level.

The operation of the circuit of FIG. 1 may be explained as follows. The parallel resonant circuit 17 causes amplifier 11 to produce a family of gain vs frequency curves as illustrated in FIG. 2, as the value of the variable resistor 21 changes. The three curves 31, 33, 35 illustrate the gain vs frequency plot for low, medium and high received levels, respectively.

As may be seen, near the resonant frequency determined by $1/(2\pi\sqrt{LC})$, the gain for each level curve 31, 33, 35 experiences a markedly higher increase over lower frequency values. Moreover, as the received level decreases in strength, the plots increase in slope.

The response illustrated in FIG. 2 is of particular use in baseband metallic transmission, for it very nearly compensates for the severe amplitude attenuation encountered on low-grade metallic circuits while still providing the small amount of compensation needed for high quality metallic circuits.

Figure 3B:
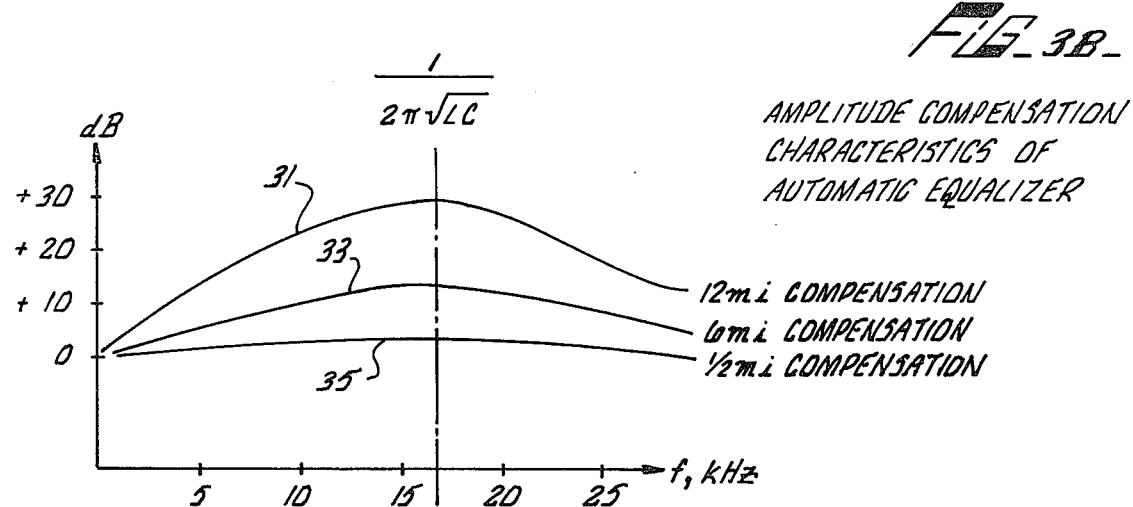
Figure 3C:
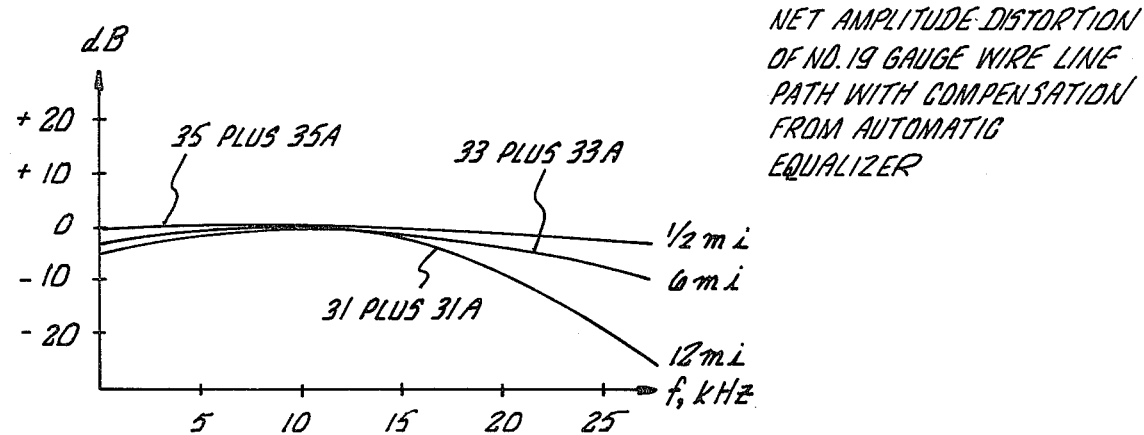

FIGS. 3A, 3B and 3C illustrate further the operation of the preferred embodiment. FIG. 3A shows the line loss characteristics of three typical types of telephone lines from a wide variety of lines. It should be understood that many different loss characteristics would be present, and only three loss characteristics are shown for sake of simplicity. A loss characteristic is determined as a function of gauge and length of the line. Thus, if gauge were held constant, the three curves 31A, 33A, and 35A would represent different line lengths. For example, the curves 31A, 33A and 35A for No 19 gauge wire lines would respectively depict the approximate attenuation distortion characteristics of 12, 6 and ½ mile line lengths. Conversely, if length were held constant then these three curves would approximately represent different gauge wires for the common line length. The manner in which numerous gauge and wire lengths produce a family of loss characteristic curves is known to the prior art and thus no further detailed description is required.

Comparison of the middle graph of FIG. 3B shows that curves 31, 33, and 35 closely approach (on an inverse basis) the loss characteristic encountered for the telephone lines depicted in 31A, 33A, and 35A of FIG. 3A. Automatic adjustment of voltage controlled resistor 21, FIG. 1, thus provides a quick and efficient means for compensating for the wide variety of loss that may be encountered.

The lower graph, FIG. 3C, depicts the equalized condition for the three lines as provided by the principles of this invention wherein the curves of 31A, 33A, 35A (FIG. 3A) are added to 31, 33 and 35 (FIG. 3B). The operating frequency of interest falls below the resonant frequency selected for the resonant circuit 17, FIG. 1. That frequency is depicted in FIG. 2 as $1/2\pi\sqrt{LC}$. The particular frequency may be selected as required for a particular modem speed and class of telephone lines. The graph of FIG. 3C shows that the principle of this invention rapidly and automatically compensates for the diverse loss characteristics of a wide variety of lines for frequencies below the resonant frequency. The equalized condition is depicted by the curves of the graph in FIG. 3C.

In summary, the just described preferred embodiment automatically compensates for both low quality and high quality metallic transmission paths. Since the circuit of the preferred embodiment is a stable feedback control circuit it is self-adjusting. By employing well-known fast settling full-wave rectifier and integrator circuits for the rectifier 23 and the integrator 25, the entire feedback control loop can be caused to settle in typically less than 2 milliseconds, thus providing a rapid means of equalizing to a metallic line transmission path. Such rapid equalization is of considerable significance in the multidrop polled configuration data modems whereby one central modem receiver must rapidly re-equalize to remote transmitters, each of which may be transmitting through a different quality metallic circuit.

As will be apparent to those skilled in the art, the just described preferred embodiment may be subjected to many modifications and adaptations without departing from the scope and spirit of the invention. Therefore, it is to be understood that, within the scope of the appended claims, the invention may be practiced other than as specifically described above.

What is claimed is:

1. A circuit for adaptively equalizing an input received data signal, said signal being selectively suppliable by any of a plurality of metallic lines of varying loss characteristics with frequency, said circuit comprising:
    an amplifier having feedback path and means supplied with said input signal and output means for producing an output signal; and
    means including resonant circuit means connected in said feedback path for deriving from said received data signal a control signal for adaptively adjusting the gain of said amplifier means to inversely match the loss in gain with frequency produced by the selected metallic line and for supplying said control signal as a feedback signal to said amplifier means.

2. The equalizing circuit of claim 1 wherein said amplifier is an operational amplifier having inverting and noninverting input terminals and an output terminal.

3. The equalizing circuit of claim 2 wherein the said data signal is supplied to said noninverting input terminal and wherein said adjusting means is connected between the output terminal and said inverting input terminal of said operational amplifier.

4. The equalizing circuit of claim 2 wherein said resonant circuit means includes a parallel resonance circuit in the feedback path of said operational amplifier.

5. The equalizing circuit of claim 2 wherein the adjusting means includes a voltage-controlled variable resistance responsive to the output signal of said operational amplifier and connected to said inverting input terminal.

6. The equalizing circuit of claim 2 wherein said adjusting means comprises:
    a parallel resonance circuit having a fixed resonant frequency connected between said inverting input terminal and the output terminal of said operational amplifier;
    means responsive to a control signal for providing a variable resistance connected to said inverting input terminal; and
    means for developing said control signal from the output signal of said operational amplifier.

7. The equalizing circuit of claim 6 wherein the said control signal is a variable voltage level.

8. The equalizing circuit of claim 6 wherein the control signal developing means comprises:
    means for full-wave rectifying said output signal to produce a rectified signal, and
    means for integrating said rectified signal.

9. An equalizer circuit for a selected one of a plurality of metallic lines characterized by varying losses with frequency and comprising:
    an operational amplifier having inverting and noninverting inputs and an output;
    a parallel resonance circuit connected between said output and said inverting input of said operational amplifier;
    a voltage controlled variable resistance connected to said inverting input; and
    means for developing a control signal for adjusting said voltage-controlled variable resistance from the output of said amplifier to inversely adjust the gain of said amplifier and match the loss in gain with the metallic line selected and in use.

10. The equalizer circuit of claim 9 wherein said parallel resonance circuit has a resonant frequency set above a selected operating frequency range over said metallic lines such that the frequency versus gain characteristic of said operational amplifier substantially inversely matches that of the selected one of said metallic lines over said frequency range.

11. A circuit supplied with a receive signal received from an arbitrary one of a plurality of metallic lines, each having a varying loss characteristic with frequency, for automatically equalizing said signal to provide an equalized output signal having a substantially flat gain versus frequency characteristic over the frequency range of interest, said circuit comprising:

an amplifier having inverting and noninverting inputs and an output, one of said inputs receiving said receive signal; and gain versus frequency responsive means including said amplifier and a resonant circuit for developing in response to said output a second signal having a gain versus frequency characteristic inversely proportional to that of said arbitrary one of a plurality of metallic lines and including means for supplying said second signal to said other one of said inputs of said amplifier.

12. The apparatus of claim 11, wherein said resonant circuit has a resonant frequency set above the operating frequency range of said arbitrary one of a plurality of metallic lines.

13. A circuit adapted to be supplied with a receive signal received from an arbitrary one of a plurality of metallic lines each having a varying loss characteristic for automatically equalizing said receive signal to provide an equalized output signal having a substantially flat gain versus frequency characteristic over the frequency range of interest said circuit comprising:

an amplifier having inverting and noninverting inputs and an output;

a resonant circuit means having a resonant frequency fixed above the operating frequency range of interest connected between said output and said inverting input;

means for developing a control signal representative of the average output level of said amplifier; and means responsive to said control signal for providing a variable resistance between ground and said inverting input.

14. A circuit for automatically equalizing an input signal selectively suppliable by an one of a plurality of metallic lines of varying loss characteristics, said circuit comprising:

an amplifier means having first and second input terminals and supplied with said input signals at said first terminal and producing an output signal; and means for automatically adjusting the gain of said amplifier to inversely match the loss in gain with frequency produced by the selected metallic line, said means including a parallel resonance circuit connected to said second input terminal and to said output signal, said resonance circuit having a resonant frequency set above the operating frequency range over said metallic lines.

15. A circuit for adaptively equalizing an input received data signal, said signal being selectively suppliable by any one of a plurality of metallic lines of varying loss characteristics with frequency, said circuit comprising:

amplifying means having a feedback path, said amplifying means accepting said input received data signal and providing an equalized output signal; and adjusting means connected in said feedback path for adaptively adjusting the output of said amplifying means to effectively compensate for the distortion introduced by the selected metallic line, said adjusting means further providing a feedback signal as a function of said equalized output signal and including variable impedance means responsive to said equalized output signal for providing said feedback signal and resonant circuit means having a fixed resonant frequency and being coupled between the output and the input of said amplifying means.

16. The equalizing circuit of claim 15 wherein said feedback signal comprises a variable voltage level.

* * * * *

UNITED STATES PATENT AND TRADEMARK OFFICE
CERTIFICATE OF CORRECTION

PATENT NO. : 4378535
DATED : March 29, 1983
INVENTOR(S) : Ran Fun Chiu; Yoon Bae Park; David Evan Nizel It is certified that error appears in the above—identified patent and that said Letters Patent is hereby corrected as shown below:

Column 6, line 7, delete "an" and insert --any--.

Signed and Sealed this

Eighth Day of May 1984

[SEAL]

Attest:

GERALD J. MOSSINGHOFF

Attesting Officer

Commissioner of Patents and Trademarks